May 25, 1965  J. W. BRIGHTMAN  3,185,468
MACHINE FOR INSERTING LOCKING INSERTS IN SCREWS
Filed Jan. 18, 1963  2 Sheets-Sheet 1

INVENTOR
JOHN W. BRIGHTMAN
BY
Brumbaugh, Free, Graves & Donohue
HIS ATTORNEYS

May 25, 1965  J. W. BRIGHTMAN  3,185,468
MACHINE FOR INSERTING LOCKING INSERTS IN SCREWS
Filed Jan. 18, 1963  2 Sheets-Sheet 2
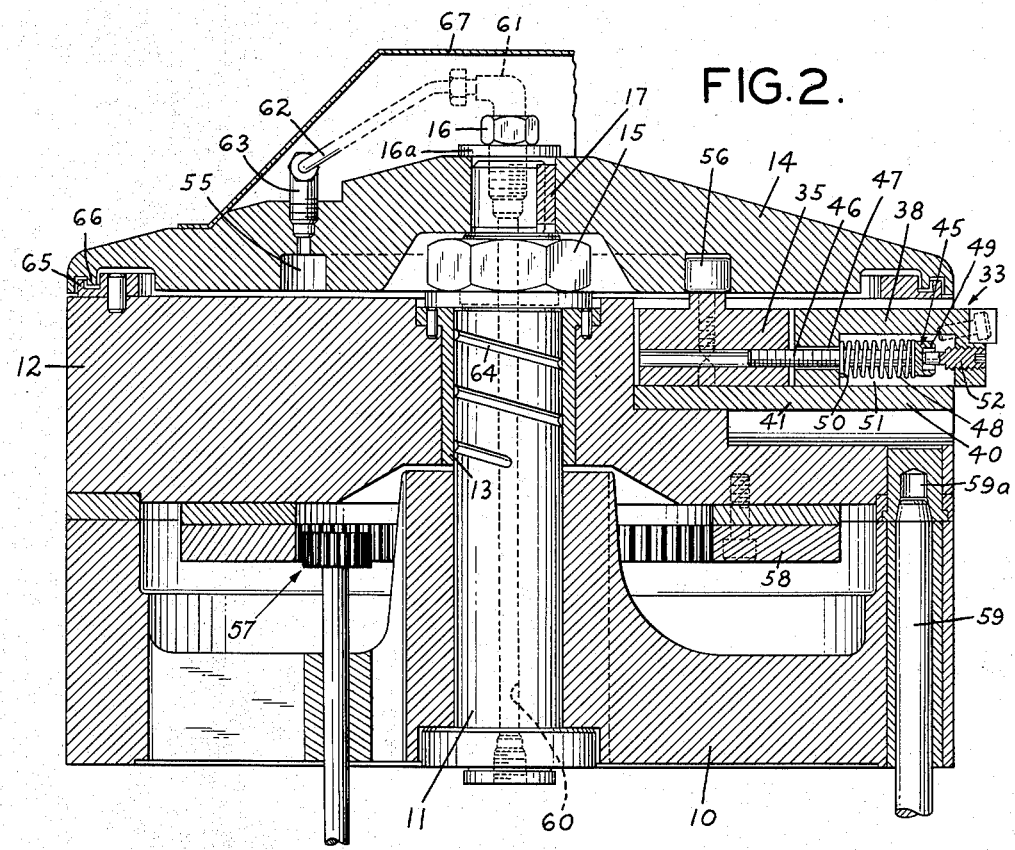
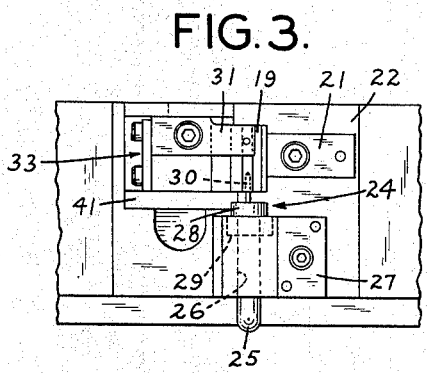
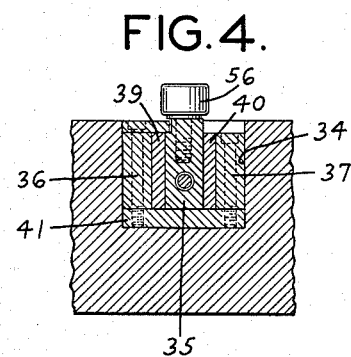
INVENTOR
JOHN W. BRIGHTMAN
BY
Brumbaugh, Free, Graves & Donohue
HIS ATTORNEYS though shown in United States Patent Office form...

United States Patent Office

3,185,468
Patented May 25, 1965

3,185,468
MACHINE FOR INSERTING LOCKING INSERTS IN SCREWS
John W. Brightman, Ridgewood, N.J., assignor to The Nylok Corporation, Paramus, N.J., a corporation of Delaware
Filed Jan. 18, 1963, Ser. No. 252,373
7 Claims. (Cl. 269—61)

This invention relates to improvements in apparatus for making self-locking threaded fastening devices such as screws, bolts and the like, and relates more particularly to an improved indexing head for receiving and clamping threaded fastening elements and moving them to various work stations where holes are drilled in the fastening elements and plugs or inserts of resilient or elastomeric material are inserted therein.

Apparatus has been provided heretofore, as shown for example in the Borner U.S. Patent No. 2,779,039 dated January 29, 1957, by means of which self-locking threaded fasteners of the types of nuts and bolts and the like are produced. In all such devices, means is provided for introducing threaded fastening devices, one after another, into retaining elements which hold them in position to enable drilling, and plug inserting operations to be accomplished without malfunction which might result from the shifting of the fastening element in the receiving or clamping device.

In accordance with the present invention, an improved type of clamping and indexing device is provided which includes means for receiving threaded fastening elements and clamping them securely in predetermined position and carrying them past the drilling and plug inserting stages without possibility of shifting of the fastening elements and misalignment of the holes drilled therein with thep lug inserting device, thereby assuring the production at high operating speed of uniform commercial products with a minimum of rejects.

More particularly in accordance with the invention, the indexing head comprises a rotary member which is provided with a plurality of fixed jaw members, each having an outwardly facing recess for receiving a threaded fastening element, such as a screw or bolt, and a slide member, offset from but adjacent to the fixed jaw member which carries a cooperating jaw member also provided with a groove which engages and clamps the fastening element against the fixed jaw. Features of the device are a stationary cam member which controls the opening and closing of the jaws and means in the slides which enables the jaws to be adjusted to accommodate fastening elements of different sizes and which is also resiliently biased so as to accommodate the jaws to variations in the dimensions of the threaded fastening elements which are normal tolerances in their production.

The arrangement of the clamping mechanism is such that the threaded fastening elements are securely retained in position, both lengthwise and in other directions, so that when a hole is drilled or otherwise formed therein for the reception of a locking insert or plug, the hole is presented accurately to the plug inserting device, thereby assuring the proper insertion and positioning of the insert or plug in the hole.

For a better understanding of the present invention, reference may be had to the accompanying drawings, in which:

FIGURE 2 is a view in section taken on line 2—2 of FIGURE 1;

FIGURE 3 is a side elevational view of one of the clamping jaws at the ejection station of the device; and FIGURE 4 is a view in section taken on line 4—4 of FIGURE 1.

Figure 1:
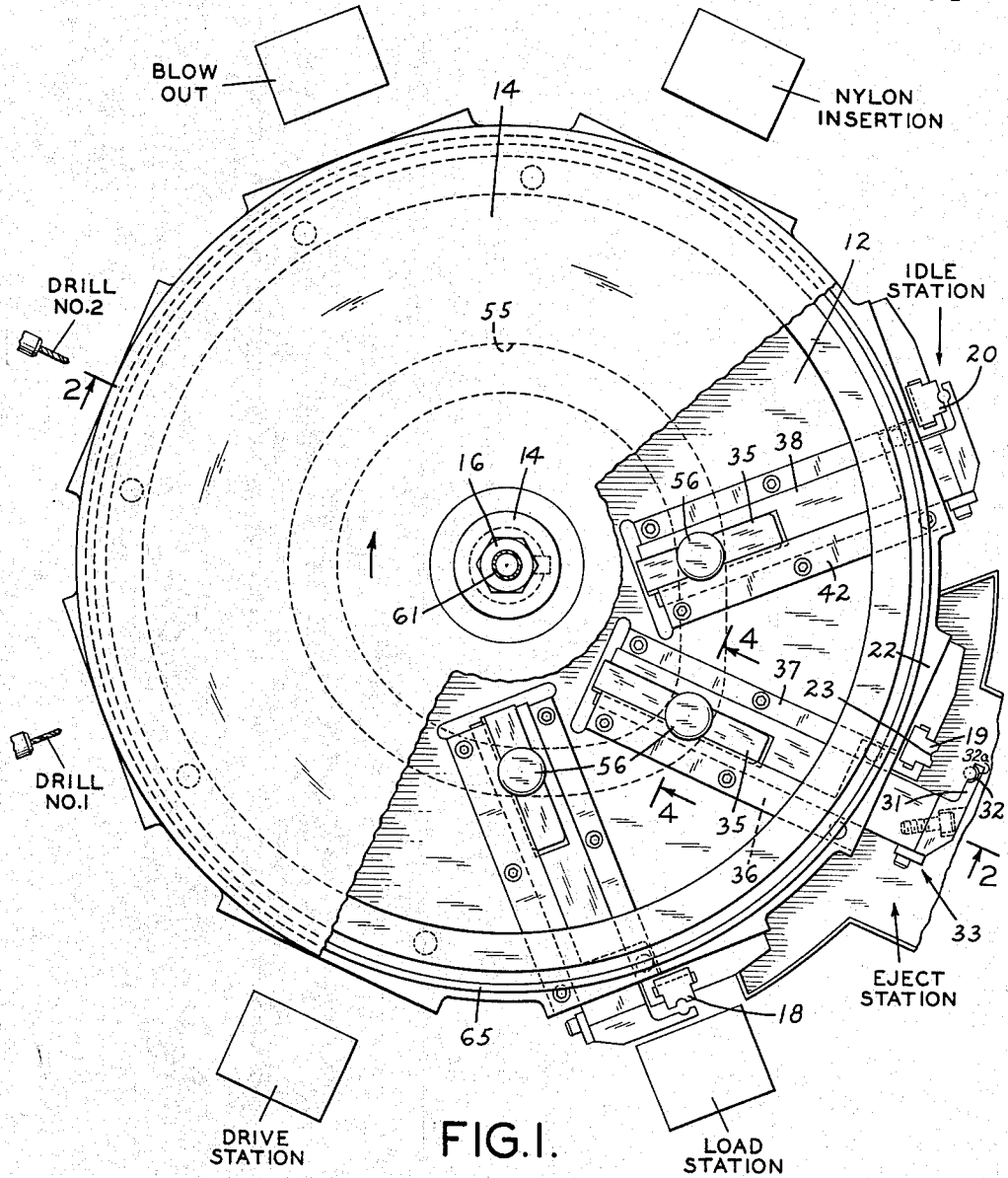
FIGURE 1 is a plan and partially broken-away view of a typical indexing and clamping device embodying the invention with the various work stations for the device indicated in block diagram.

Referring to FIGURES 1 and 2, a typical apparatus embodying the invention includes a supporting base or frame 10 which may be mounted on a bench or other platform which is adapted to carry a drive motor and other driving connections, not shown. Fixed to and extending upwardly from the base 10 is a fixed shaft 11 which carries an indexing head 12 provided with an inner bushing or bearing 13 supporting the indexing head 12 for rotation relative to the shaft 11. On the upper end of the shaft 11 is a cam and cover member 14 which is clamped on the shaft by means of an adjusting nut 15, a clamping nut 16 and a washer 16a. Further, the cover and cam member is secured non-rotatably to the shaft by means of a key 17 received in suitable grooves in the upper end of the shaft and the cover and cam member 14.

Mounted in spaced relation around the periphery of the indexing head 12 are a series of clamping jaws 18, 19, 20, etc. Inasmuch as all of the clamping elements of the present invention are the same, only one complete clamping element will be described. The clamping jaw 19 is mounted on top of and extends downwardly over the outer face of a bar 21 which is screwed or otherwise secured to a flat vertical face 22 on the periphery of the indexing head 12. Directly beneath the jaw 19, and in alignment with an outwardly facing groove 23 therein, is a positioning pin 24 having a shank 25 slidably received in a bore 26 in a supporting block 27 also secured to the flat face 22 by screws or in any other suitable way. The positioning pin 24 is provided with an enlarged head 28 which is retractible into a counterbore or recess 29 in the supporting block 27. The jaw 19 is provided with a downwardly extending threaded positioning pin 30 which engages the head of the positioning pin 24 to enable the jaw to be adjusted accurately on the indexing head and thereby position a screw supported by the jaw in a predetermined relation to a drill hole in an outer clamping jaw 31.

The outer clamping jaw 31 comprises a laterally extending block member having an inwardly facing groove 32 opposing the groove 23 in the fixed clamping jaw. The groove 32 in jaw 31 may be provided with threads 32a to mesh with the threads on the fastening element or may be smooth, as desired. The jaw 31 extends laterally from and is detachably mounted on the outer end of a slide member 33 which is slidably received in a nonradially extending recess 34 (FIGURES 2 and 4) in the upper surface of the indexing member. Referring to FIGURE 1, the fixed clamping jaw 19 faces generally radially outward from the center of the indexing head but the slide 33 is nonradially disposed and moves generally parallel to a radius of the indexing head.

As best shown in FIGURES 2 and 4, each slide member 33 includes an inner section in the form of a narrow block 35 which is slidable between a pair of parallel side legs 36 and 37 extending from an outer block section 38. In other words, the outer section 38 has bifurcated extensions 36 and 37 which engages the opposite sides of and guide the block 35. In order to minimize wear and friction, flat bearing plates 39 and 40 are interposed between the legs or blocks 36 and 37 and a bearing plate 41 of low friction material, such as bronze or the like, may be secured to the undersurface of the outer slide section 38. The entire slide is retained in the recess 34 by means of an overlying guide plate 42 which is recessed into the top of the indexing head and overlies the leg 36, bushing 39 and the inner block 35. In this way, the slide 33 is movable inwardly and outwardly relative to the indexing head 12 and the outer section 38 and the inner section 35 can move relatively. Adjustment of these sections relative to each other is accomplished by means of an adjusting screw 45 having a threaded shank portion 46 threaded in the block 35 and slidably received in a bore 47 at the inner end of the outer slide block section 38. A spring 48 is interposed between an enlarged head 49 on the screw and a shoulder 50 at the inner end of the recess 51 in which the head of the screw and the spring are received. With this arrangement, it will be apparent that the spring 48 tends to urge the outer slide section 38 toward the inner slide section 35. Appropriate adjustment of the positions of the two slide block sections 35 and 38 is accomplished by means of a socket head screw 52 which is threaded into the end of the slide block section 38 and can be adjusted to bear against the bottom of a recess in the head 49 of the screw 45. In this way, by adjusting the screw 52 inwardly or outwardly, the two sections of the slide 33 may be appropriately adjusted lengthwise while nevertheless permitting further extension of the slide due to compression of the spring.

In the operation of the indexing head, it is necessary for the jaws 19 and 31 to be moved apart or opened and then to be closed to grip and retain the threaded fastening element. As shown in FIGURES 1 and 2, inward and outward movement of the clamping jaw 31 and the slide 33 is accomplished by means of a cam track 55 formed in the undersurface of the cover and cam member 14 and receiving a cam follower, such as a cam follower roller 56, on each of the inner sections 35 of the slide members. In this way, inward and outward movement of each slide can be controlled, for example as illustrated in FIGURE 1, so that the outer clamping jaw 31 is spaced from the inner jaw 19, at the loading station, a sufficient distance to enable a threaded fastening element, such as a screw, to be received between the jaws. As the indexing head moves clockwise as viewed in FIGURE 1, the cam track 55 moves the slide 33 and jaw 31 inwardly to grip the screw. At the drive station, the screw is seated in the jaws and thereafter is carried successively past the drills, a station where the chips are blown out of the recess, and the station where the insert, such as a nylon plug, is inserted into the hole. The finished article is then carried past an idle station and finally to an eject station where, as shown in FIGURES 1 and 3, the jaw 31 is moved outwardly permitting the screw to be ejected.

Rotation of the indexing head 12 may be accomplished in any of a number of ways as, for example, by means of a Geneva movement, a pawl and ratchet mechanism or other mechanism, the motion of which is transmitted by means of a shaft and pinion 57 to a gear or drive member 58 on the underside of the indexing head 12. Accurate alignment of the screws with drills, plug insertion device and so forth is assured by a retractible plunger 59 mounted on the base 10 engageable in and disengageable from bushed recesses 59a in the indexing head 12 below the jaws 19 (FIGURE 2). The plunger is retracted during rotation of the head 12 and projected as the head stops in its intermittent rotation.

Lubricant is supplied to the moving parts of the apparatus by means of a drilled passage 60 in the shaft 11 which supplies oil through a coupling 61, tubing 62 and a metering nozzle 63 into the cam groove 55, through which, and by leakage along the spiral oil passage 64, to the bushing 13. Also, the oil leaking from the groove 55 serves to lubricate the slides 33 of the apparatus.

In order to further protect the mechanism and prevent the entry of chips, dirt or the like into the slide and operating mechanism, the undersurface of the cover and cam plate 14 and the upper surface of the indexing head 12 may be provided with elements having interfitting grooves 65 and ridges 66, forming a labyrinth therebetween. A protective cover 67 of sheet metal or the like may be mounted on top of the cover and cam member 14 in order to protect the oil fittings, if desired.

From the preceding description, it will be apparent that the indexing head embodying the present invention is provided with positively actuated clamping jaws which can be adjusted and replaced readily to accommodate different sizes of screws, bolts and the like, and because of the resilience in connection between the elements of the outer clamping jaw slide, the jaws can accommodate themselves to the changes in dimensions which inevitably occur in the manufacture of fastening devices of the same intended size, thereby avoiding damage to the threads on the fastening elements but nevertheless assuring the firm clamping thereof against shifting in all directions.

It will be understood that numerous changes may be made in the arrangement and relation of the parts of the slide, in the size and dimensions of the parts, as well as the number of clamping jaws on the indexing head and the manner in which the indexing head is moved from one work station to another.

Accordingly, it should be understood that the form of the invention described herein is illustrative and that the invention is intended to be limited only as defined in the following claims.

I claim:

1. Apparatus for making self-locking screws and the like comprising a rotary indexing head, a plurality of jaw members fixed to and extending substantially radially outwardly from said head and having an outwardly facing substantially vertical groove therein, a slide member in said head adjacent to each of said jaw members, a laterally extending jaw member on each slide member having an inwardly facing groove therein opposing the groove in an adjacent fixed jaw member, fixed cam means overlying said indexing head, a cam follower on each slide member engaging said cam means for moving said slide inwardly and outwardly relative to said head, means for adjusting the spacing between the laterally extending jaw member and the cam follower on each slide member, and means for rotating said head relative to said cam means.

2. The apparatus set forth in claim 1 in which said means for adjusting the spacing between the laterally extending jaw member and the cam follower comprises an inner section on said slide member carrying said cam follower, a separate relatively movable section carrying said laterally extending jaw member, an adjusting screw threadedly engaging said inner section and slidably received in said outer section.

3. The apparatus set forth in claim 2 comprising a head on said screw, spring means engaging said head and a portion of said outer section urging it toward said inner section and enabling relative movement therebetween, and another adjusting screw in said outer section engageable with said head to limit movement of said outer section toward said inner section.

4. The apparatus set forth in claim 1 in which at least one of each of said inner and outer opposing jaw members has threads in the groove therein.

5. Apparatus for making self-locking threaded fasteners comprising a movable indexing head, a jaw member fixed to and extending outwardly from said head and having an outwardly facing groove therein for receiving a threaded fastener, a slide member slidably mounted in said head offset from said fixed jaw member, a laterally extending jaw member on said slide member having an inwardly facing groove opposing the groove in said fixed jaw member, cam means adjacent to said head, a cam follower on said slide member engaging said cam means, means for moving said head and said cam means relatively to move said slide member endwise and said laterally extending jaw member toward and away from said fixed jaw member and means for adjusting the spacing between said laterally extending jaw member and said cam follower.

6. The apparatus set forth in claim 5 in which said means for adjusting the spacing between the laterally extending jaw member and the cam follower comprises an inner section on said slide member carrying said cam follower, a separate relatively movable section carrying said laterally extending jaw member, an adjusting screw threadedly engaging said inner section and slidably received in said outer section.

7. The apparatus set forth in claim 6 comprising a head on said screw, spring means engaging said head and a portion of said outer section urging it toward said inner section and enabling relative movement therebetween, and another adjusting screw in said outer section engageable with said head to limit movement of said outer section toward said inner section.

No references cited.

ROBERT C. RIORDON, *Primary Examiner.*